No. 747,024. PATENTED DEC. 15, 1903.
F. WEISE.
DUPLEX STEAM PUMP.
APPLICATION FILED AUG. 7, 1903.
NO MODEL. 2 SHEETS—SHEET 2.
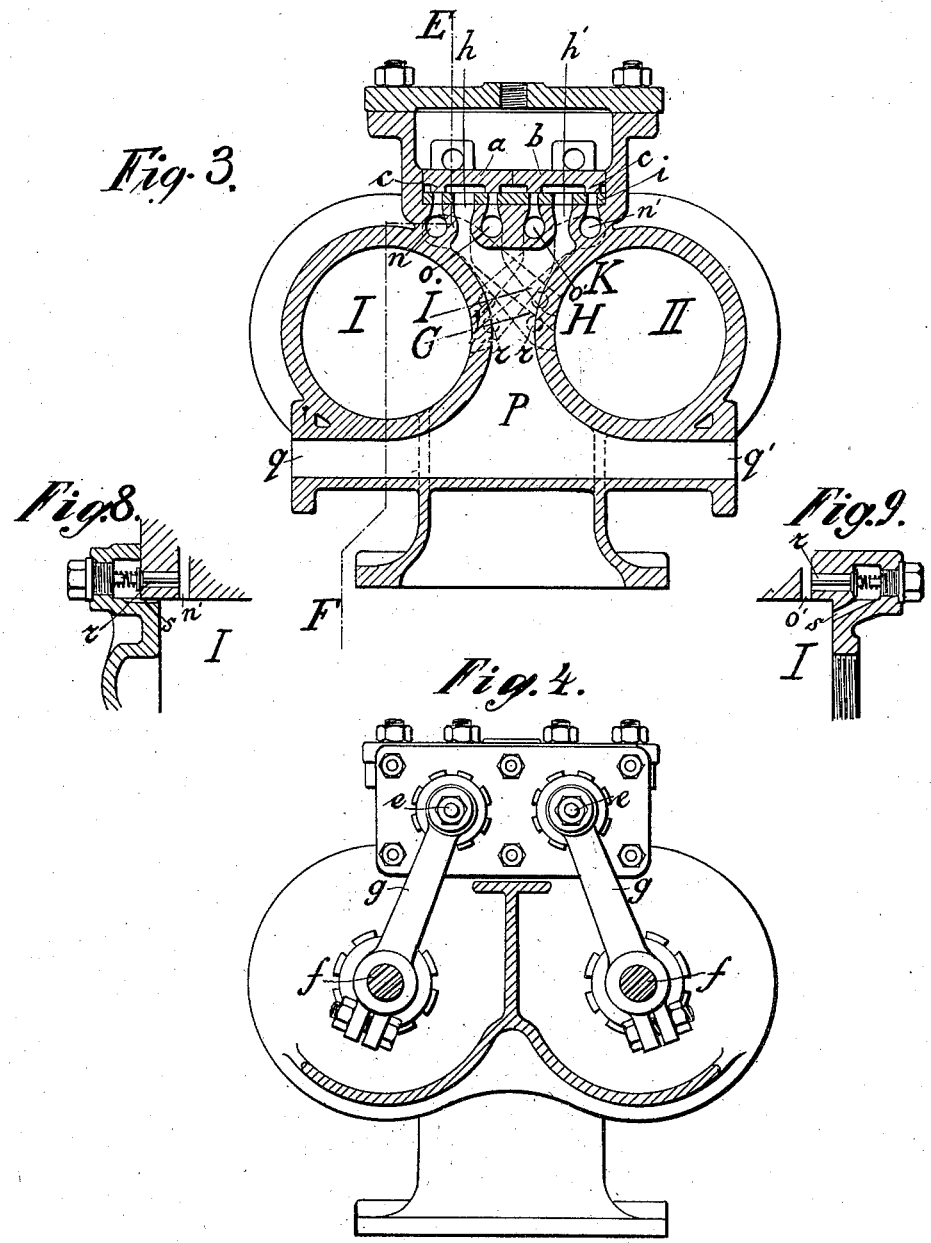

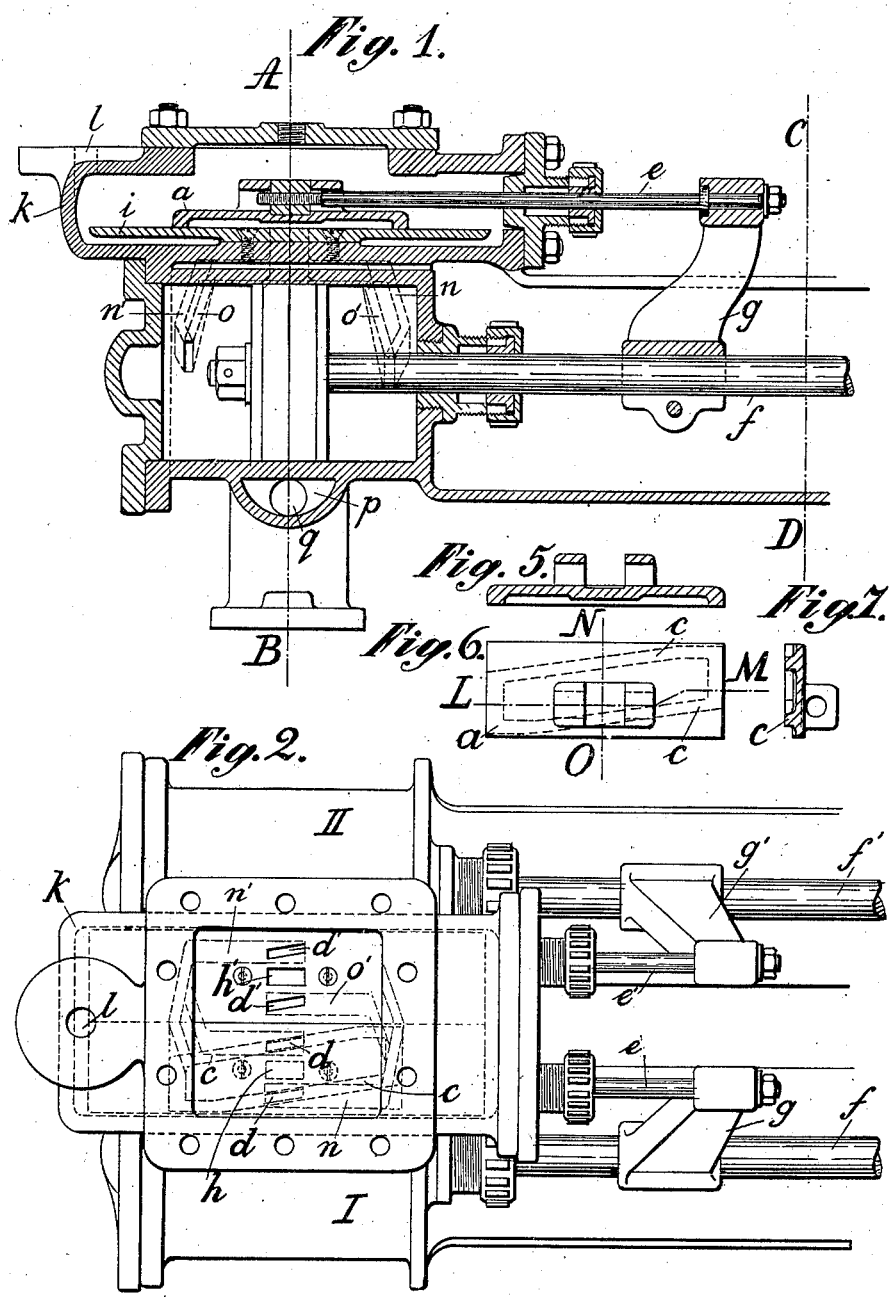

No. 747,024.

Patented December 15, 1903.

UNITED STATES PATENT OFFICE.

FELIX WEISE, OF HALLE-ON-THE-SAALE, GERMANY.

DUPLEX STEAM-PUMP.

SPECIFICATION forming part of Letters Patent No. 747,024, dated December 15, 1903.

Application filed August 7, 1903. Serial No. 168,594. (No model.)

*To all whom it may concern:*

Be it known that I, FELIX WEISE, a citizen of the Empire of Germany, residing at Halle-on-the-Saale, in the Empire of Germany, have invented a new and useful Non-Rotative Duplex Steam-Pump, of which the following is a specification.

My invention relates to improvements in non-rotative duplex steam-pumps by which the piston-rod of the one steam-cylinder can be rigidly connected with the rod of the slide-valve controlling the steam distribution of the other cylinder, and vice versa, so that all intermediate gears usually employed are dispensed with; and the objects of my improvement are, first, to place the ports in the slide-valve seat for the steam distribution of the two cylinders in one and the same center line at right angles to the axes of the cylinders; second, to lengthen the slide-valve seat in the longitudinal direction of the cylinders, and, third, to provide two long rectangular slide-valves with inclined distributing-ribs moving side by side for controlling the steam-distribution. I attain these objects by the mechanism illustrated in a mode of execution in the accompanying drawings, in which—

Figure 1 is a vertical longitudinal section through the one steam-cylinder of a non-rotative duplex steam-pump on the broken line E F in Fig. 3. Fig. 2 is a plan of the two steam-cylinders, the cover of the slide-valve chest and one of the two slide-valves being removed. Fig. 3 is a vertical cross-section through the two steam-cylinders on the line A B in Fig. 1. Fig. 4 is a vertical cross-section through the line C D in Fig. 1 to show the end views of the two steam-cylinders. Fig. 5 is a vertical longitudinal section through one distributing slide-valve on the broken line L M in Fig. 6. Fig. 6 is a plan of the same. Fig. 7 is a cross-section through the same on the line N O in Fig. 6. Fig. 8 is a longitudinal section through a rear part of the one steam-cylinder on the line G H in Fig. 3, and Fig. 9 is a similar section through a front part of this cylinder on the line I K in Fig. 3.

Similar letters of reference refer to similar parts throughout the several views.

The two steam-cylinders I and II are cast in one piece with the common slide-valve chest $k$, to which the steam is admitted at $l$. In opposition to the ordinary steam-cylinders the six steam-ports $d$ $h$ $d$ $d'$ $h'$ $d'$ for the two steam-cylinders I and II are placed in the same center line at right angles to the axes of the two cylinders. In the drawings it is assumed that the piston-rods of the two steam-cylinders are connected direct to the rods of the slide-valves arranged above the cylinders. In consequence of this the external port $d$ above the cylinder I is put into communication with the right end of the other cylinder II by a broken channel $n$ and the internal port $d$ is connected with the left end of the cylinder II by a broken channel $o$. The two broken channels $n$ and $o$ consist each of a cylindrical part parallel to the axes of the two cylinders and a flattened part. In a similar manner the external port $d'$ above the cylinder II is put into communication with the left end of the cylinder I by a broken channel $n'$, the flattened part of which crosses past the flattened part of the channel $o$, while the internal port $d'$ is connected with the right end of the cylinder I by a broken channel $o$, the flattened part of which equally crosses past that of the channel $n$. The two middle exhaust-ports $h$ and $h'$ are connected with the two exhaust-pipes $q$ $q'$ by a common exhaust-chamber $p$. Where so preferred, the one exhaust-pipe $q$ or $q'$ may be omitted. The channels $n$ $o$ $n'$ $o'$ are assumed to terminate in the cylinder-walls at a certain distance from the inside of the bottoms or covers, (see Figs. 1, 8, and 9,) so that they will alternately be closed by the rings of the steam-pistons in the extreme positions of the latter. In order to enable, nevertheless, the live steam to enter the respective ends of the cylinders, spring-pressed valves $r$ $r$ are arranged in the ends of the channels $n$ $o$ $n'$ $o'$ parallel to the axes of the cylinders and their chambers are connected by channels $s$ $s$, Figs. 8 and 9, with the cylinders I and II, respectively. The piston-rod $f$ of the cylinder I is rigidly connected with the rod $e$ of the slide-valve $a$ above this cylinder by means of an arm $g$, the slitted nave of which is secured on the piston-rod $f$ by means of a bolt and nut. Thus every steam-piston and the slide-valve above it are obliged to move together.

The two slide-valves $a$ and $b$ are rectangular and move in opposite directions. They are each provided on the lower side with two inclined ribs $c\ c$, Fig. 6, of a sufficient width to overlap the two equally-inclined inlet-ports $d\ d$ and $d'\ d'$, respectively, on both sides when the slide-valves are in their middle positions, as is shown at Fig. 2. When the piston in the cylinder I is assumed to be in its extreme position on the left in Figs. 1 and 2, the external inclined rib $c$ of the slide-valve $a$ will have opened the external port $d$, so that steam is admitted through the channel $n$ to the cylinder II on the right, where the second steam-piston at this moment occupies its extreme position on the same side. The port in the wall of the cylinder II being closed by the second piston, the live steam will open the respective valve $r$ and enter the cylinder II through the channel $s$ and drive the second piston from the right to the left. As soon as the said port in the cylinder-wall is again opened by the second piston the valve $r$ under the action of its spring will close, while the further admitted steam enters the cylinder II direct through the channel $n$. At the same time when the first piston occupies its said initial position the internal inclined rib $c$ of the slide-valve $a$ will have opened the internal port $d$ within the cavity of the slide-valve to allow the spent steam in the cylinder II on the left of its piston to exhaust through the middle port $h$, the exhaust-chamber $p$, and the respective exhaust-pipe $q$ or $q'$. It is evident that when at this moment the piston in the cylinder II occupies its extreme position on the right the second slide-valve $b$ will have opened the external port $d'$ to admit live steam through the channel $n'$ to the cylinder I on the left, and it will also have opened the internal port $d'$ within its cavity to allow the exhaust-steam from the cylinder I on the right to escape through the channel $o'$, the middle port $h$, and the exhaust-chamber $p$. Therefore the piston in the cylinder I will proceed from the left to the right and at the same time the piston in the cylinder II from the right to the left. On the two pistons arriving in their other extreme positions similar occurrences will take place to reverse their directions.

Since the two slide-valves $a$ and $b$ have the same stroke as the two steam-pistons, they are necessarily long, which means that their seat $i$ requires to be longer than the two cylinders. In order to be better able to make the seat $i$ true, it is preferably cast separately, as a plate of bronze, and secured in the slide-valve chest $k$ in any known manner—for example, by four countersunk screws, as shown.

The non-rotative duplex steam-pump described so far can be varied in many respects without deviating from the spirit of my invention.

The valves $r$ and channels $s$ may be omitted if the ports in the cylinder-walls are so disposed in the ordinary manner as to be never closed by the pistons.

The inclinations of the ribs $c$ on the slide-valves and of the external ports $d\ d$ and $d'\ d'$ may be inverted, and the ribs $c$ on the two slide-valves $a$ and $b$ may be inclined in opposite directions. It is evident that the channels $n\ o\ n'\ o'$ will require to be arranged accordingly. Where so preferred, the two external ports $d\ d$ above the cylinder I may be connected direct with the latter by means of suitable channels, and in a similar manner the two external ports $d'\ d'$ above the cylinder II may be connected direct with the latter. In this case, of course, the piston-rod $f$ of the cylinder I will require to be rigidly connected with the valve-rod $e'$ above the cylinder II say, by a straight arm similar to $g$, while the piston-rod $f$ of the cylinder II is connected with the valve-rod $e$ above the cylinder I say, by a curved arm, which is so bent as to leave space for the upper end of the other straight arm.

What I claim as my invention, and desire to secure by Letters Patent, is—

1. In a duplex steam-pump, the combination with the steam-cylinders, of steam-pistons, piston-rods, rectangular slide-valves, each provided with longitudinal distributing-ribs inclined to the axes of such steam-cylinders, sets of ports for each of the slide-valves and disposed at right angles to the axes of the steam-cylinders, channels connecting certain external ports of either of said sets of ports, each with the ends of either of said steam-cylinders, means for connecting certain middle ports of said sets of ports, each with the atmosphere or a container, slide-valve rods, and arms rigidly connecting said piston-rods with said slide-valve rods in such manner that the slide-valve attached to each slide-valve rod controls the steam distribution of the steam-cylinder to which a second piston-rod belongs and vice versa, substantially as set forth.

2. In a non-rotative duplex steam-pump, the combination with two steam-cylinders cast in one piece, of one common valve-chest, two steam-pistons, two piston-rods, two long rectangular slide-valves each provided with two parallel longitudinal distributing-ribs inclined to the axes of said two steam-cylinders, two sets of three ports each for said two long rectangular slide-valves disposed in said common valve-chest at right angles to the axes of said two steam-cylinders, two channels connecting the two external ports of either of said two sets of three ports each above the one steam-cylinder with the two ends of the other steam-cylinder, a common exhaust-chamber connecting the middle ports of said two sets of three ports each with the exhaust-pipe, two slide-valve rods, and one arm for each of said two steam-cylinders rigidly connecting its piston-rod with its slide-valve rod.

3. In a non-rotative duplex steam-pump, the combination with two parallel steam-cylinders cast in one piece with the common valve-chest, of two steam-pistons, two piston-rods, a detachable plate secured in said valve-chest and serving as a common slide-valve seat, two long rectangular slide-valves each provided with two parallel longitudinal distributing-ribs inclined to the axes of said two steam-cylinders, two sets of three ports each for said two long rectangular slide-valves disposed in a common center line in the middle of said detachable plate at right angles to the axes of said two steam-cylinders, the two external ports in said two sets of three ports each being parallel to said two parallel longitudinal distributing-ribs of the respective slide-valve and overlapped thereby in its middle position, two channels connecting the two external ports of either of said two sets of three ports each above the one steam-cylinder with the two ends of the other steam-cylinder, a common exhaust-chamber connecting the middle ports of said two sets of three ports each with the exhaust-pipe, two slide-valve rods, and one arm for each of said two steam-cylinders rigidly connecting its piston-rod with its slide-valve rod.

In testimony whereof I have signed my name to this specification in the presence of two subscribing witnesses.

FELIX WEISE.

Witnesses:
 HENRY HASPER,
 FRANK H. MASON.